UNITED STATES PATENT OFFICE.

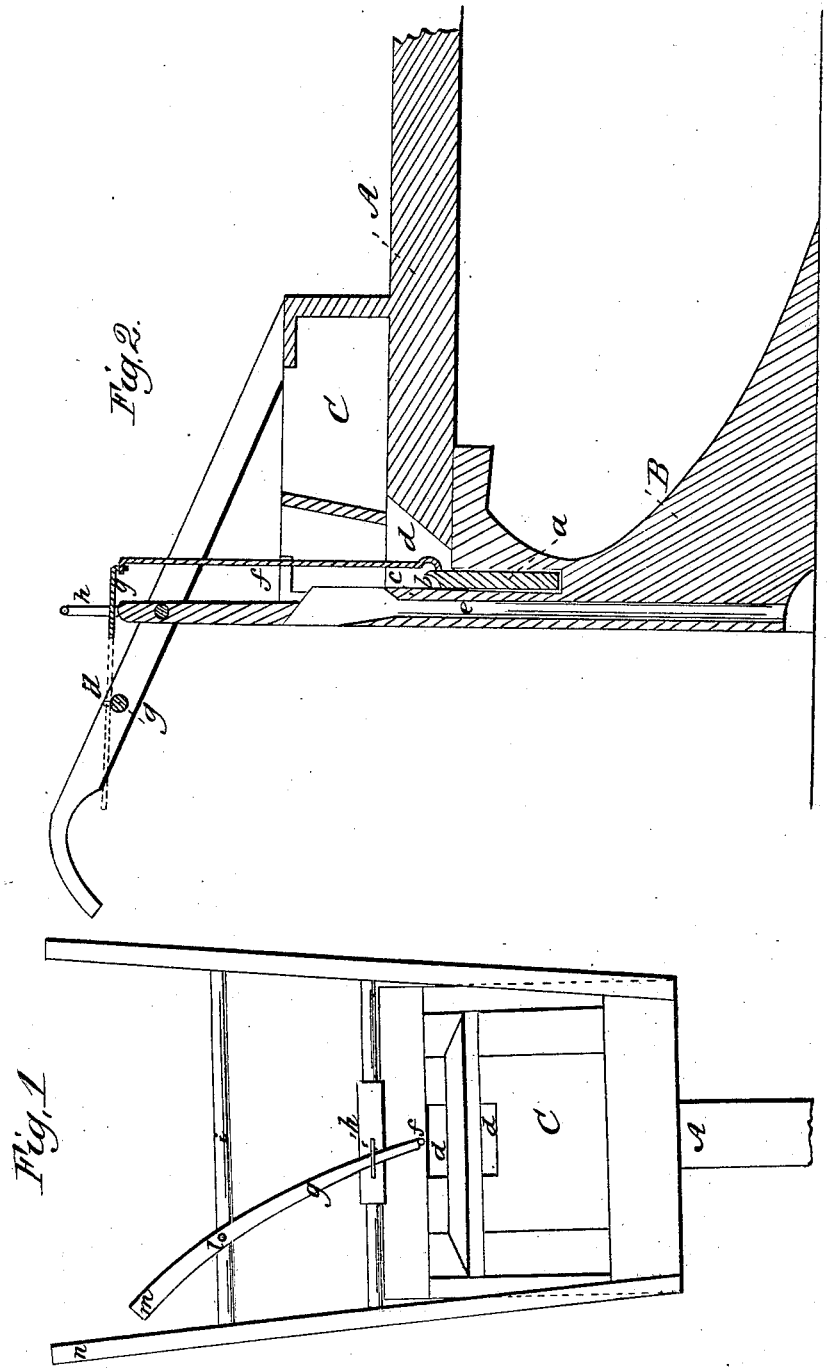

NATHAN C. DAVIS, OF WEST JEFFERSON, OHIO.

IMPROVEMENT IN SEED-PLANTERS.

Specification forming part of Letters Patent No. 10,169, dated October 25, 1853.

*To all whom it may concern:*

Be it known that I, NATHAN C. DAVIS, of West Jefferson, in the county of Madison and State of Ohio, have invented a new and Improved Planting-Machine; and I do hereby declare that the following is a full and exact description thereof, reference being had to the accompanying drawings, making part of this specification—

Figure 1 being a plan of my improved planting-machine, and Fig. 2 a longitudinal vertical section thereof.

Like letters designate corresponding parts in both figures.

My improved planting-machine is made nearly in the form of a plow, having a beam, A, by which it is drawn, a drill-tooth or share, B, for opening the furrow, and handles for guiding it. A drill-box, C, is situated upon the rear end of the beam A, in which the grain is put, and a depression, $d$, situated below said drill-box, gradually receives the grain therefrom, whence it is distributed to the ground in the following manner: An aperture, $e$, leads down through the back part of the drill-tooth, and is separated from the depression $d$ by a thin partition, $c$, close to which a small metallic piston, $a$, slides up and down in an aperture below the depression $d$. In the upper end of this piston is a hollow, $b$, large enough to hold as many grains of corn as it is desired to plant in each hill, and open on the side next to said partition $c$, so as to let out the grains when it is raised above said partition. A rod, $f$, connects the piston with one end of a lever, $g$, which vibrates on a rod, $i$, as a fulcrum, extending between the handles of the planter. The end of said lever to which the rod $f$ is attached is limited in its motion by a loop, $h$, and the other end, $m$, is situated near the right handle, $n$, so that it may be pressed down by the thumb of the operator.

The corn to be planted is placed in the drill-box C, whence it falls into the depression $d$, which is thus kept full. While the machine is being drawn forward the operator, guided either by lines marked across the rows at proper distances beforehand or by practice, whereby he soon is enabled to drop the seed at the proper distances apart, presses down the end $m$ of the lever $g$ at certain intervals, by which the piston $a$ is lifted up through the grain in the depression $d$, so that the kernels in the hollow $b$ will fall out over the partition $c$ into the aperture $e$ and be conveyed to the furrow. On lifting the thumb the lever and piston fall back again, and the hollow $b$ again becomes filled with grain from the depression $d$ ready for the next hill.

Having thus fully described my improved planting-machine, what I claim therein as new, and desire to secure by Letters Patent, is—

The piston $a$, provided with a notch or hollow, $b$, in its upper end, and so arranged in combination with the partition $c$ and depression $d$ that it will bring up and discharge through the aperture $e$ the desired number of grains of corn every time it is raised by the operator, substantially in the manner herein set forth.

The above specification of my improved planting-machine signed and witnessed this 2d day of March, 1853.

N. C. DAVIS.

Witnesses:
M. B. BATEHAM,
S. D. HARRIS.